United States Patent
Allen et al.

(10) Patent No.: US 9,763,280 B1
(45) Date of Patent: Sep. 12, 2017

(54) MOBILE DEVICE ASSIGNMENT WITHIN WIRELESS SOUND SYSTEM BASED ON DEVICE SPECIFICATIONS

(71) Applicant: INTERNATIONAL BUSINESS MACHINES CORPORATION, Armonk, NY (US)

(72) Inventors: Corville O. Allen, Morrisville, NC (US); Mario A. Maldari, Lyons, CO (US); Monica A. Murray, College Park, GA (US); Paul A. Smith, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/188,049

(22) Filed: Jun. 21, 2016

(51) Int. Cl.
H04B 7/00 (2006.01)
H04W 76/02 (2009.01)
(Continued)

(52) U.S. Cl.
CPC ......... *H04W 76/023* (2013.01); *H04W 4/008* (2013.01); *H04W 8/005* (2013.01)

(58) Field of Classification Search
CPC ....................................................... H04S 7/30
See application file for complete search history.

(56) References Cited

U.S. PATENT DOCUMENTS 8,626,178 B2 1/2014 Johansen
8,712,328 B1 4/2014 Filev et al.
(Continued)

FOREIGN PATENT DOCUMENTS

EP 1 615 464 A1 1/2006

OTHER PUBLICATIONS

Harris, Tom, "How Surround Sound Works", How Stuff Works, http://electronics.howstuffworks.com/home-theater3.htm, downloaded May 5, 2016 (5 pages).
(Continued)

*Primary Examiner* — Hsin-Chun Liao
(74) *Attorney, Agent, or Firm* — Michael A. Petrocelli, Esq.; Kevin P. Radigan, Esq.; Heslin, Rothenberg, Farley & Mesiti

(57) ABSTRACT

Establishing a wireless sound system is achieved using mobile devices, by: obtaining identifying information on multiple mobile devices within wireless proximity to a control node; automatically ascertaining acoustic-related specifications for the multiple mobile devices using the identifying information; dynamically assigning, based on the acoustic-related specifications, the multiple mobile devices to different component roles; and sending, from the control node of the sound system, wireless signal channels to the multiple mobile devices based on their different component roles to provide acoustic output. In one or more implementations, at least two mobile devices of the multiple mobile devices have different acoustic-related specifications, and two or more of the component nodes within the sound system have different desired specifications. The assigning matches mobile devices to component roles based on a comparing the acoustic-related specifications of the devices to the desired specifications of the component roles.

17 Claims, 10 Drawing Sheets

(51) Int. Cl.
*H04W 4/00* (2009.01)
*H04W 8/00* (2009.01)

(56) References Cited

U.S. PATENT DOCUMENTS

| | | |
|---|---|---|
| 8,892,233 B1 | 11/2014 | Lin et al. |
| 8,989,552 B2 | 3/2015 | Slotte |
| 9,154,877 B2 | 10/2015 | Kim et al. |
| 9,277,321 B2 | 3/2016 | Toivanen et al. |
| 2010/0088192 A1* | 4/2010 | Bowles .................. G06Q 10/30 705/26.1 |
| 2012/0142273 A1* | 6/2012 | Ozaki ................. H04M 1/6091 455/66.1 |
| 2014/0277646 A1 | 9/2014 | Anderson et al. |
| 2014/0362995 A1 | 12/2014 | Backman et al. |
| 2015/0277847 A1 | 10/2015 | Yliaho et al. |

OTHER PUBLICATIONS

Slashgear, "Dolby Bringing Surround Sound to Tablets and Smartphones", http://www.slashgear.com/dolby-bringing-surround-sound0to-tables-and-smartphones-22321706, downloaded May 5, 2016 (9 pages).
"Splitting Sound Inputs Between Left and Right Channels in Windows 7", http://superuser.com/questions/517068/. . . , downloaded on May 5, 2016 (1 page).
Audacity Manual, "Splitting and Joining Stereo Tracks", http://manual.audacityteam.org/o/man/splitting_and_joining_stereo_tracks.html, downloaded May 5, 2016 (5 pages).
Aguilar, Nelson, "Mobile Surround Sound: How to Make any Android Device a Wireless Speaker for Your Samsung Galaxy Note 2", http://electronics.howstuffworks.com/surround-sound5.htm, downloaded May 5, 2016 (6 pages).

* cited by examiner

MOBILE DEVICE ASSIGNMENT WITHIN WIRELESS SOUND SYSTEM BASED ON DEVICE SPECIFICATIONS

BACKGROUND

There currently exist a variety of portable computing devices (i.e., mobile devices), including wireless computing devices, such as mobile telephones, personal digital assistants (PDAs), tablets, laptop computers, wireless computers, etc., which are small, lightweight, and easily carried by users. These mobile devices (including cellular telephones, internet protocol (IP) telephones, smartphone devices, etc.) can communicate audio and data packets over wireless networks The ability to facilitate communication between and integration of mobile devices continues to be an area of great interest and continued research for, for instance, establishing commercial advantage in the industry.

SUMMARY

The shortcomings of the prior art are overcome and additional advantages are provided through the provision of a method of establishing a wireless sound system, which includes: obtaining identifying information on multiple mobile devices within wireless proximity to a control node of the sound system; automatically ascertaining acoustic-related specifications for the multiple mobile devices using the identifying information; dynamically assigning, based on the acoustic-related specifications, the multiple mobile devices to different component roles within the sound system; and sending, from the control node of the sound system, wireless signal channels to the multiple mobile devices based on their different component roles to provide acoustic output of the sound system.

In another aspect, a system for establishing a wireless sound system is provided, which includes: a memory, and a processing device communicatively coupled with the memory. The system performs a method, including: obtaining identifying information on multiple mobile devices within wireless proximity to a control node of the sound system; automatically ascertaining acoustic-related specifications for the multiple mobile devices using the identifying information; dynamically assigning, based on the acoustic-related specifications, the multiple mobile devices to different component roles within the sound system; and sending, from the control node of the sound system, wireless signal channels to the multiple mobile devices based on their different component roles to provide acoustic output of the sound system.

In a further aspect, a computer program product is provided for establishing a wireless sound system. The computer program product includes a computer readable storage medium readable by a processing circuit and storing instructions for execution by the processing circuit for performing a method, which includes: obtaining identifying information on multiple mobile devices within wireless proximity to a control node of the sound system; automatically ascertaining acoustic-related specifications for the multiple mobile devices using the identifying information; dynamically assigning, based on the acoustic-related specifications, the multiple mobile devices to different component roles within the sound system; and sending, from the control node of the sound system, wireless signal channels to the multiple mobile devices based on their different component roles to provide acoustic output of the sound system.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
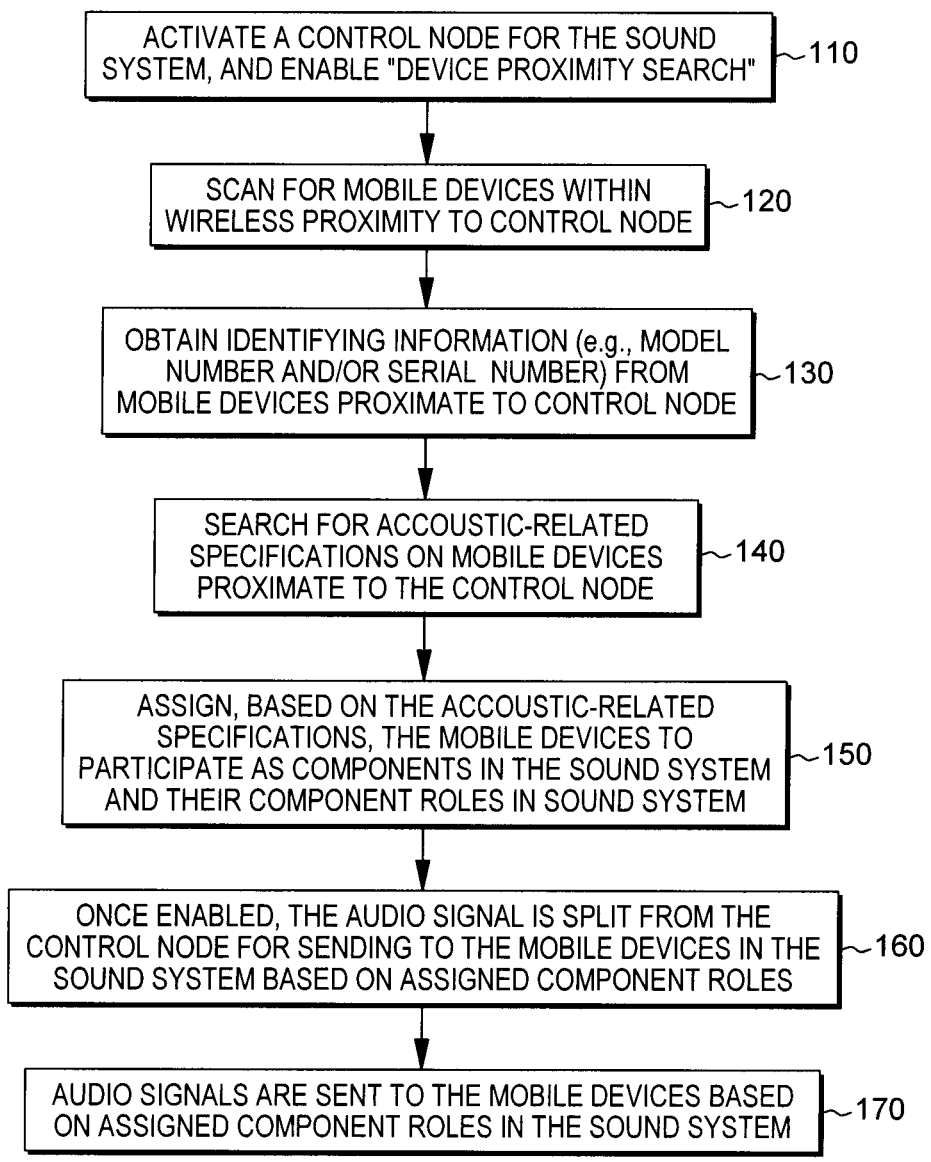
FIGS. 1A-1C depict one embodiment of a dynamic process for establishing a wireless sound system using multiple mobile devices, in accordance with one or more aspects of the present invention.

Mobile devices are ubiquitous today, and facilitating integration of mobile devices into new and different systems continues to be of great interest as the technology develops. Entertainment is one area where device integration capabilities are important. Taking advantage of the prevalence of mobile devices, disclosed herein is a dynamic approach to configuring mobile devices as component nodes within a wireless sound system based on differences in the actual acoustic-related specifications of the mobile devices.

Existing sound systems, such as a stereo system or surround sound system, typically use specially-designed physical components, such as speakers, as component nodes within the system. These components are typically manually programmed and configured based, for instance on, location and distance to a display screen, such as a television screen.

In addition, the components are oftentimes fixed in one location, and seldom moved. Similarly, the sound system oftentimes fixedly assigns the speakers in the sound system to particular roles.

In addition to considering and/or setting, for instance, distance and proximity of devices in assigning participation in the wireless sound system, disclosed herein are methods, systems, and computer program products which further utilize, for instance, one or more actual device specifications for the individual mobile devices within wireless proximity to a central or control node of the sound system, and configuring the sound system by assigning the mobile devices to different component roles of the sound system using their different device specifications. This may include, for instance, determining which mobile device has the best acoustic capability for a particular role, such as the best base range, treble range, overall volume, clarity of sound, etc., to perform a desired functional role within the wireless sound system being dynamically established. For example, in one or more implementations, a surround sound system may have different component roles, such as, sub-woofer, center speaker, right/left front speaker, right/left back speakers, etc., and thus assigning each mobile device a role within the surround sound system may be based on the specified capabilities of the individual mobile devices that are identified within wireless proximity to the primary control node of the sound system, as described further herein.

By way of further example, methods, systems, and computer program products are provided herein which utilize, for instance, audio acoustic properties of the chips and/or speakers of the mobile devices to fine-tune the role of each mobile device in the playback channels of the sound system. For instance, the audio profile of a mobile device can be deduced, and the sound system may be adjusted to play, for instance, a left, right, or front channel, etc., in a specific way, such as enhanced for voice, but with less bass, reducing the bass output if that is not available for the device, or vice versa. In this manner, the acoustic abilities of the individual mobile devices to be included in the sound system may be determined and best utilized.

Before discussing dynamic establishing of a wireless sound system in accordance with one or more aspects of the present invention, mobile devices in general are briefly described. By way of example, in one or more embodiments, a mobile device may have a wireless communication capability, and be, for instance, a mobile phone, a personal digital assistant (PDA), a wireless computer, a laptop computer, tablet, etc. The wireless communication capability or system may be, for instance, a Code Division Multiple Access (CDMA) system, a Global System for Mobile Communication (GSM), a Wideband CDMA (W-CDMA) system, a Long-Term Evolution (LTE) system, an LTE Advanced system, etc.

The mobile device may be capable of providing bidirectional communication via a receive path and a transmit path. On the receive path, signals transmitted by base stations may be received by an antenna, and provided to a receiver. The receiver conditions and digitizes the receive signals, and provides the conditioned and digitized signals to a digital section of the mobile device for further processing. On a transmit path, a transmitter may receive data to be transmitted from the digital section, and process and condition the data, and generate a modulated signal, which may be transmitted via the antenna to one or more base stations. The receiver and the transmitter are part of the transceiver, and support, for instance, CDMA, GSM, W-CDMA, LTE, LTE Advanced, etc.

The digital section of the mobile device may include various processing, interfaces, and memory units, such as, for example, a modem processor, a reduced instruction set computer/digital signal processor (RISC/DSP), a controller/processor, an internal memory, a generalized audio encoder, a generalized audio decoder, a graphics/display processor, and/or an external bus interface (EBI). The modem processor may perform processing for data transmission and reception, for example, encoding, modulation, demodulation, and decoding. The RISC/DSP may perform general and specialized processing for the wireless device. The controller/processor may control the operation of various processing and interface units within the digital section. The internal memory stores data and/or instructions for various units within the digital section.

A generalized audio encoder performs encoding for input signals from an audio source, a microphone, etc. A generalized audio decoder performs decoding for coded audio data and provides output signals to, for instance, a speaker. The graphics/display processor performs processing for graphics, videos, images, and texts, which are presented to a display unit. The EBI facilitates the transfer of data between the digital section and a main memory. The digital section may be implemented with one or more processors, DSPs, microprocessors, RISCs, etc. The digital section may also be fabricated on one or more application-specific integrated circuits (ASICs), and/or other types of integrated circuits (ICs).

In general, a mobile device such as described herein is indicative of various types of devices, such as a wireless phone, a cellular phone, a laptop computer, a wireless multimedia device, a tablet, a wireless communication personal computer (PC), a PDA, etc. Any mobile device such as these referenced herein may have memory for storing instructions and data, as well as hardware, software, and firmware, and combinations thereof to perform the processes disclosed herein.

In one or more aspects, a dynamic configuration approach is provided which utilizes mobile devices capable of producing sound (e.g., music) to serve are wireless component nodes or speakers for a sound system. The approach may include, for instance, first detecting the geolocation of the devices relative to each other, and in particular, relative to a control node of the system, and dynamically creating, for instance, a zoned 5.1 or 7.1 surround speaker set. The mobile devices within wireless proximity may be scanned or searched for identifying information to facilitate obtaining their acoustic capabilities or specifications, and a determination may be made as to what type of component node each mobile device would best function within, such as sub-woofer, center speaker, etc. This may be based on the mobile device's acoustic-related specifications or characteristics, such as sound chip and speaker capabilities, base tones, frequency, overall sonic output, etc. The mobile devices may be coordinated within the sound system by sending specific wireless signal channels to specific mobile devices over, for instance, a short wave protocol, such as Bluetooth. An advantage of this approach is that it produces the best available sound system experience by factoring in each mobile device's specifications, as well as the desired specifications for the different component roles in the sound system, to determine the best mobile device to deliver each component role, and thereby create the best sound system experience. In addition, the acoustic capabilities of each mobile device's sound chip and speaker may be taken into account to fine-tune the role of each mobile device in a particular playback channel, where the sound system can deduce the audio profile and set the sound system so that, for instance, left, right, or front channels, etc., produce sound in a specific way enhanced for the capabilities of the individual mobile device, such as enhanced for voice, but with less bass, reducing the bass output if the bass range is limited on the particular mobile device assigned to that channel, or vice versa.

As explained further below, the sound system may be a stereo sound system, a surround sound system, or any other sound system desired, depending, in part, on the number of mobile devices within wireless proximity to the control node of the sound system. Note that the control node of the sound system may itself be another mobile device, or more generally, any processing system capable of performing the methods disclosed herein. In one or more implementations, each mobile device may be configured with processing to operate as either the control node or as a component node within the sound system, depending on a user's current preference. For instance, one mobile device functioning as a component node, such as a sub-woofer, in one implementation of the sound system, may be in another implementation the control node. By way of further example, in one or more embodiments, the control node may alternatively be a device such as a television, set top box, desktop computer, workstation, or other control unit.

As one example, FIG. 1A depicts an embodiment of a process 100 for establishing a wireless sound system using multiple mobile devices, in accordance with one or more aspects of the present invention. In this embodiment, process 100 includes activating a control node for the sound system and enabling a device proximity search from the control node 110. Once enabled, the device proximity search scans for mobile devices within wireless proximity of the control node 120. As part of the scanning, or subsequent to the scanning for mobile devices, identifying information is obtained for each mobile device within wireless proximity of the control node 130. For instance, a model number, serial number and/or other unique device identifier may be obtained from each mobile device within wireless proximity of the control node.

The control node automatically, dynamically ascertains acoustic-related specifications for the multiple devices using the identifying information 140. Based on the acoustic-related specifications, the mobile devices may be selected to participate as components in the sound system, and may be assigned specific component roles in the sound system 150. In addition to selecting and assigning the mobile devices to the different component roles of the sound system based on the device's acoustic-related specifications, one or more of the mobile devices may be directed to be repositioned relative to the control node, or a display unit associated with the control node, to provide, for instance, a desired distance between the mobile devices and the control node or display unit. Once the sound system is enabled, an audio signal may be split (for instance, by the control node) for sending to the mobile devices in different signal channels of a wireless protocol of the sound system based on their assigned component roles 160, after which the signal channels may be wirelessly sent to the mobile devices based on their different component roles to provide the desired acoustic output for the sound system 170.

Figure 1B:
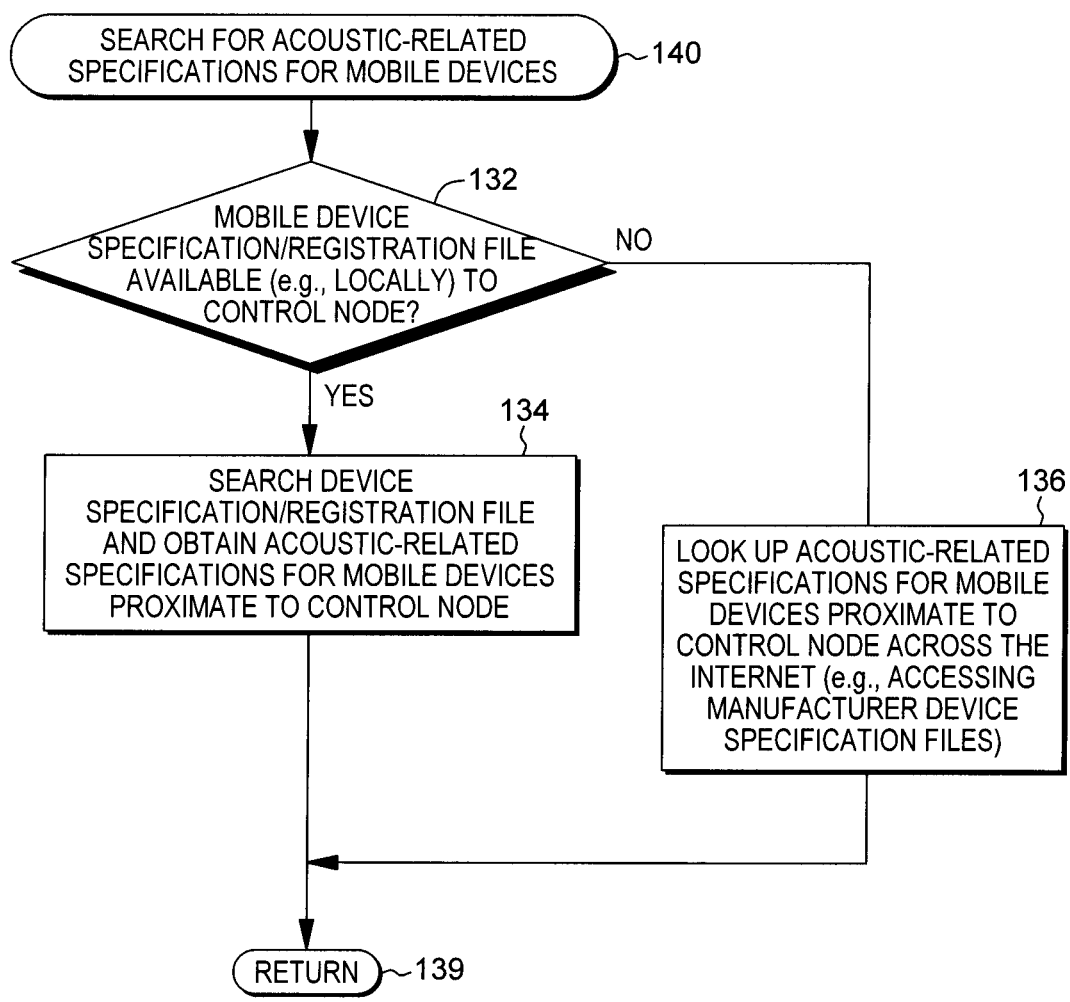

By way of example, FIG. 1B depicts one embodiment for searching for actual acoustic-related specifications of the mobile devices in wireless proximity to the control node 140. As shown, processing may initially determine whether there is a mobile device specification or registration file available to the control node 132. For instance, in one or more embodiments, the control node may accommodate a mobile device registration file which includes relevant acoustic-related specifications for many, if not all, commercially available mobile devices. This file could be initially generated and periodically updated, as desired, to ensure acoustic-related specifications for the latest mobile devices are available, for instance, locally, or alternatively, across the Internet at a central repository, such as in a cloud computing environment. If "yes", then the device specification/registration file is searched to obtain one or more acoustic-related specifications for the identified mobile devices within wireless proximity to the control node 134, which completes the processing 139. Alternatively, if a mobile device specification/registration file is not available to the control node, then the control node could look up the actual acoustic-related specifications for the mobile devices proximate to the control node across the Internet 136. For instance, the control node could access one or more websites or databases to obtain the actual manufacturer device specifications for the identified mobile devices. Once obtained, processing returns 139 to, for instance, the processing embodiment of FIG. 1A.

Figure 1C:
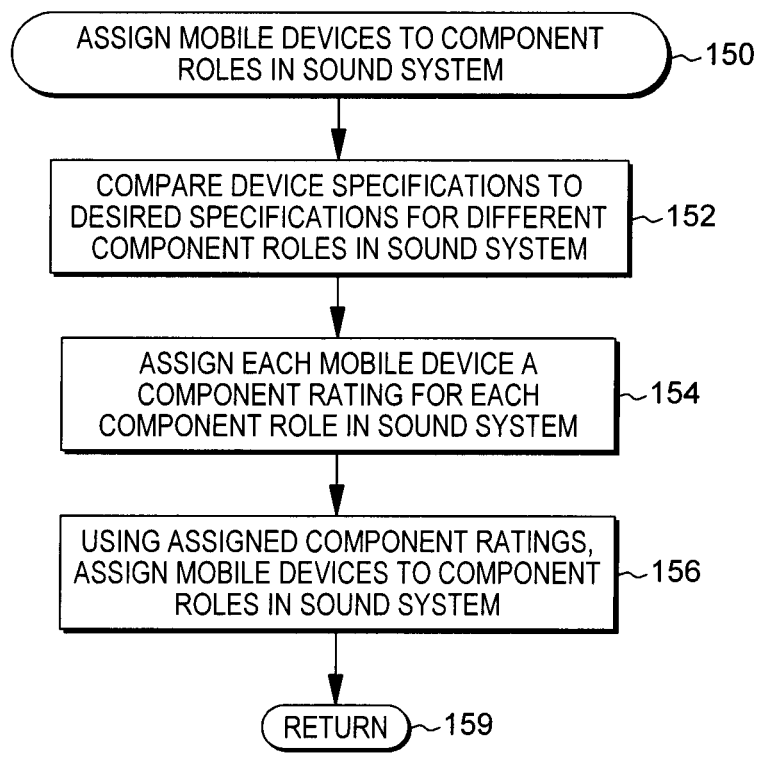

FIG. 1C illustrates one example of a process for assigning mobile devices to different component roles in a wireless sound system being dynamically configured 150. The process may include comparing device specifications, that is, the ascertained acoustic-related specifications for the multiple devices within wireless proximity to the control node, to certain desired specifications for different component roles in the sound system 152. As noted, depending on the wireless sound system desired, different component roles may be defined. For instance, in a stereo system, left and right speakers may be desired, while in a surround sound system, left/right-front speakers, left/right-back speakers, a sub-woofer, and a center speaker may all be desired, some or all of which may have different desired specifications associated with the different component roles.

In one or more embodiments, processing assigns each mobile device in wireless proximity to the control node a component rating for at least one component role in the sound system, or alternatively, for each component role in the sound system 154. For instance, for a surround sound system to have a sub-woofer, each mobile device may be assigned a component rating as to how the acoustic-related specifications for that mobile device match the desired specifications for the sub-woofer of the wireless sound system being configured. The mobile device with acoustic-related specifications most closely matching the desired specifications would have the highest component rating assigned. Using the assigned component ratings, the mobile devices may be selected to participate in the sound system, and based on the assigned component ratings, may be assigned to specific component roles in the sound system 156. For instance, if ten mobile devices are within wireless proximity to the control node, but only five wireless devices are required for the desired surround sound system, then the processing may select the five mobile devices most closely matching the desired specification for the component roles of the wireless sound system being configured. Once the mobile devices are assigned the different component roles, processing returns 159 to, for instance, the processing of FIG. 1A. Note that in one or more other implementations, all mobile devices within wireless proximity to the control node may be employed within the sound system being configured, with, for instance, two or more wireless devices serving in a common component role, if desired. By way of example, where excess wireless devices are provided, two or more center speakers could be configured for the wireless sound system, and/or two or more sub-woofers, two or more left/right front speakers, etc.

Figure 2:
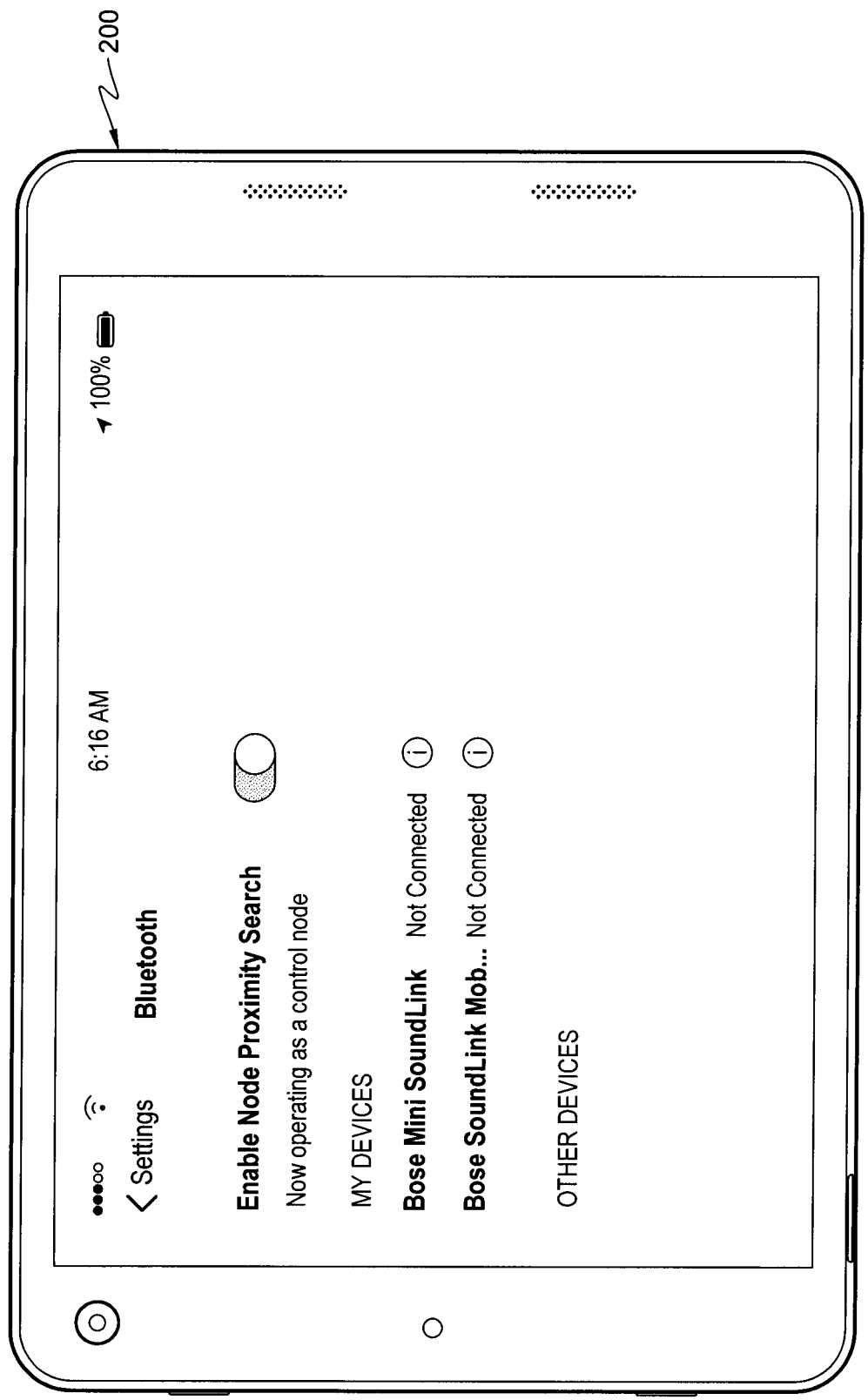
FIG. 2 depicts one example of a mobile device to operate as control node of a sound system, wherein a settings configuration is depicted which once enabled, initiates a node or device proximity search to identify mobile devices within wireless proximity to the control node that may participate in the wireless sound system, in accordance with one or more aspects of the present invention.

By way of example, FIG. 2 illustrates one embodiment of a mobile device, such as a tablet-type mobile device, with a settings configuration depicted wherein a user has enabled a node proximity search from the mobile device. In one or more implementations, by enabling the node proximity search, the user designates this mobile device 200 as the control node for the wireless sound system to be configured. In one or more embodiments, it is assumed that one or more of the available mobile devices may have node proximity search capabilities, and the ability to operate as a control node or primary node for a wireless sound system, as described herein, including an ability to split an audio signal into different signal channels for sending to multiple mobile devices once they are assigned component roles within the sound system.

Figure 3:
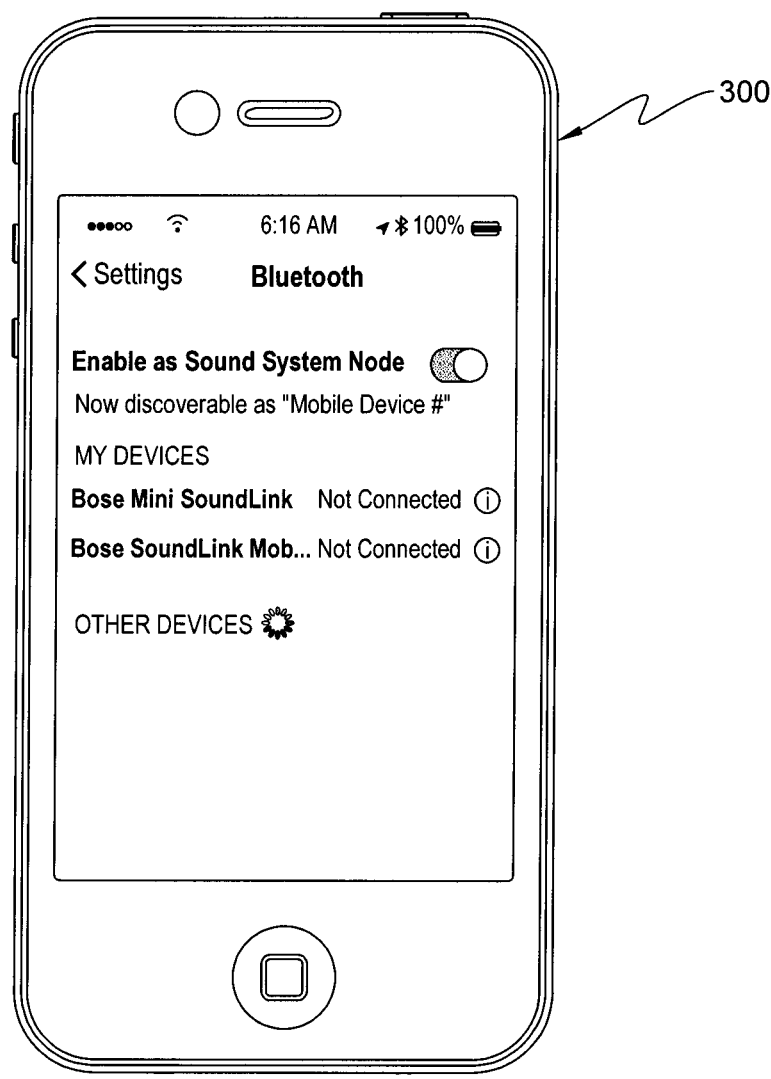
FIG. 3 depicts one embodiment of a display of a mobile device within wireless proximity to the control node, wherein a settings configuration is depicted showing the mobile device, by way of example, Bluetooth-enabled to participate as a component node in the wireless sound system, in accordance with one or more aspects of the present invention.

FIG. 3 illustrates another embodiment of a mobile device 300, such as a smartphone device. In the illustrated example, a settings configuration is again depicted on mobile device 300, wherein the device is activated or enabled as a sound system node. In one or more embodiments, once enabled as a sound system node, the mobile device 300 is detectable in a wireless proximity search by control node 200 of FIG. 2, with identifying information, such as a mobile device identifier number being provided by mobile device 300 to mobile device 200. As noted, the identifying information from mobile device 300 may be any unique identifier number, such as a model number, serial number, etc.

Figure 4:
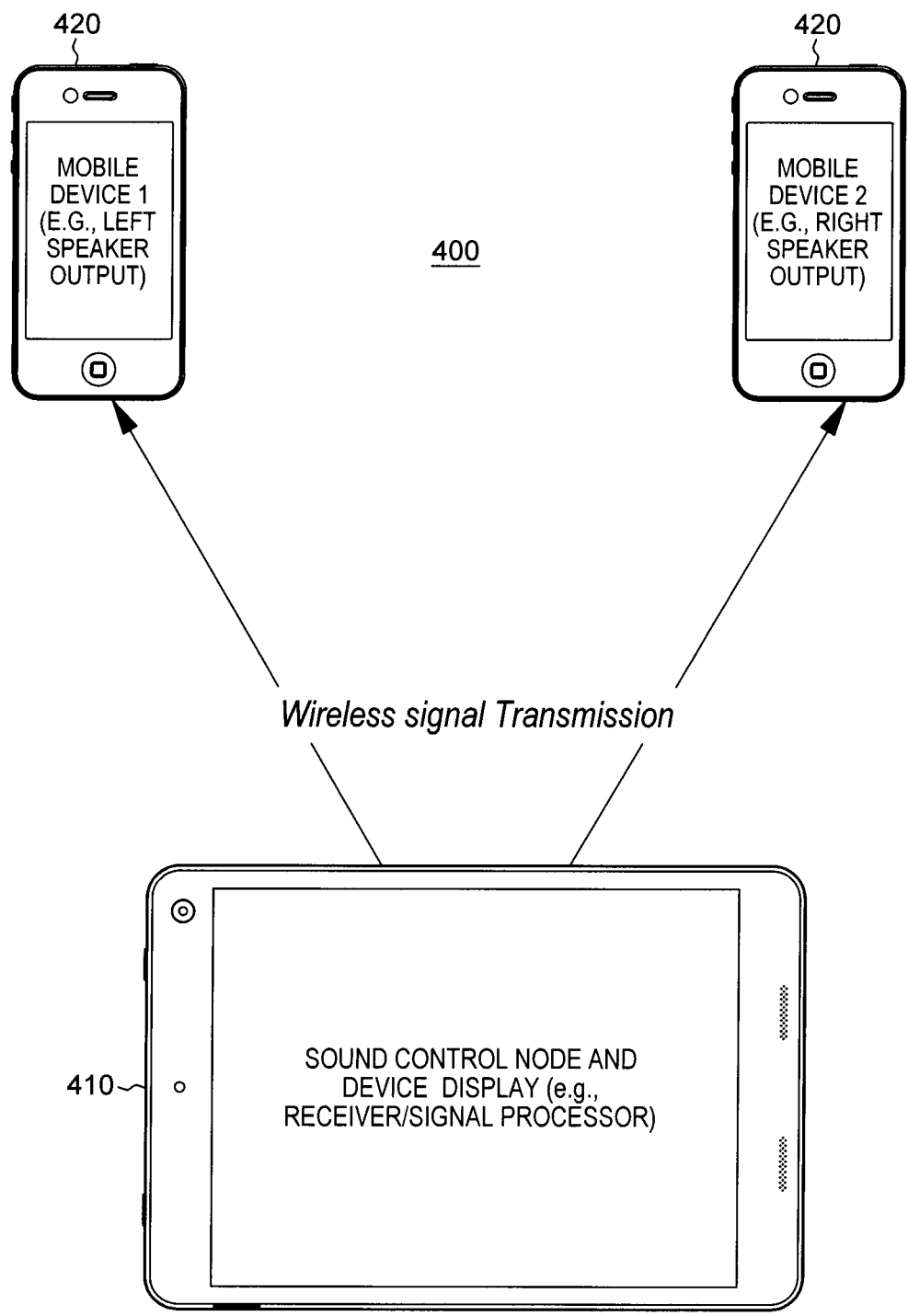
FIG. 4 is an illustration of one example of a dynamically-configured, wireless sound system, in accordance with one or more aspects of the present invention.

By way of example, FIG. 4 illustrates a wireless sound system 400 configured using the implementation processing described herein. Sound system 400 is an example of a stereo sound system, with a control node 410 and left and right speaker component roles being performed by assigned mobile devices 420. In the illustrated example, mobile devices 420 are spaced from control node 410 a desired distance, which may involve repositioning one or both of the mobile devices (or the control node), as desired and/or as prompted (e.g., by the control node).

To dynamically implement wireless sound system 400, a user may turn on or activate control node 200 (e.g., a tablet-type device), and chose in the settings configuration "enable proximity search" (see FIG. 2). This enables the proximity determination of any mobile devices in near proximity to the control node. As part of, or following, the proximity search, identifying information may be obtained for each mobile device within wireless proximity to the control node. For instance, a model, serial, or other identifying number, may be obtained from the mobile devices by looking in the settings file for the mobile device through a basic application program interface (API). The identifying information for the mobile devices in wireless proximity to the control unit is then used to ascertain, for instance, through one or more searches, actual acoustic-related specifications for the mobile devices. In one or more implementations, the acoustic-related specifications may include, for instance, sound chip and/or speaker specifications, such as speaker size, speaker volume, base range, etc., and may depend on the particular implementation. The search may involve an online mode search, and/or an offline mode search. In an online mode search, the control node may access one or more device specification files across the Internet, for instance, one or more manufacturer device specification files, while in offline mode, the device may have a preexisting, local device registration file in an accessible database, where instead of searching across the Internet to obtain the information, the control node obtains the information locally from the database. In one or more embodiments, the local database or device registration file may include registered device information, such as serial number, model number, and acoustic-related specifications.

Using the acoustic-related specifications, the control node selects, in this example, two mobile devices to operate, for instance, as the left and right speakers in stereo sound system 400. The mobile devices may be chosen by, for instance, assigning a component rating to each identified mobile device based on a comparison of that mobile device's acoustic-related specifications with desired specifications for the different component roles in the sound system. Once the mobile devices are assigned their particular component roles, then the control node may split the audio signal and deliver the appropriate signals through different wireless signal channels to the different mobile devices 420, as will be understood by those skilled in the art. Note that in this example, it is assumed that the individual mobile devices have already been set or configured to participate in the sound system as a component node. In one embodiment, this may be performed as described above in connection with FIG. 3. In operation, a user may continue to watch video on tablet 410, while sound is played in stereo through mobile devices 420, which may be located in front or back of the control node, or the associated display unit, as desired.

As noted, the control node may be implemented at or by a variety of different devices, with a mobile device, such as a tablet, being one example only. In one or more other embodiments, a television, set top box, desktop computer, workstation, or other control unit, could be used to implement the surround sound processing described herein. The implementation processing steps would be similar, and once the wireless sound system is enabled, the audio signal would be split or delegated appropriately to the mobile devices based on their different component roles in the system.

Figure 5:
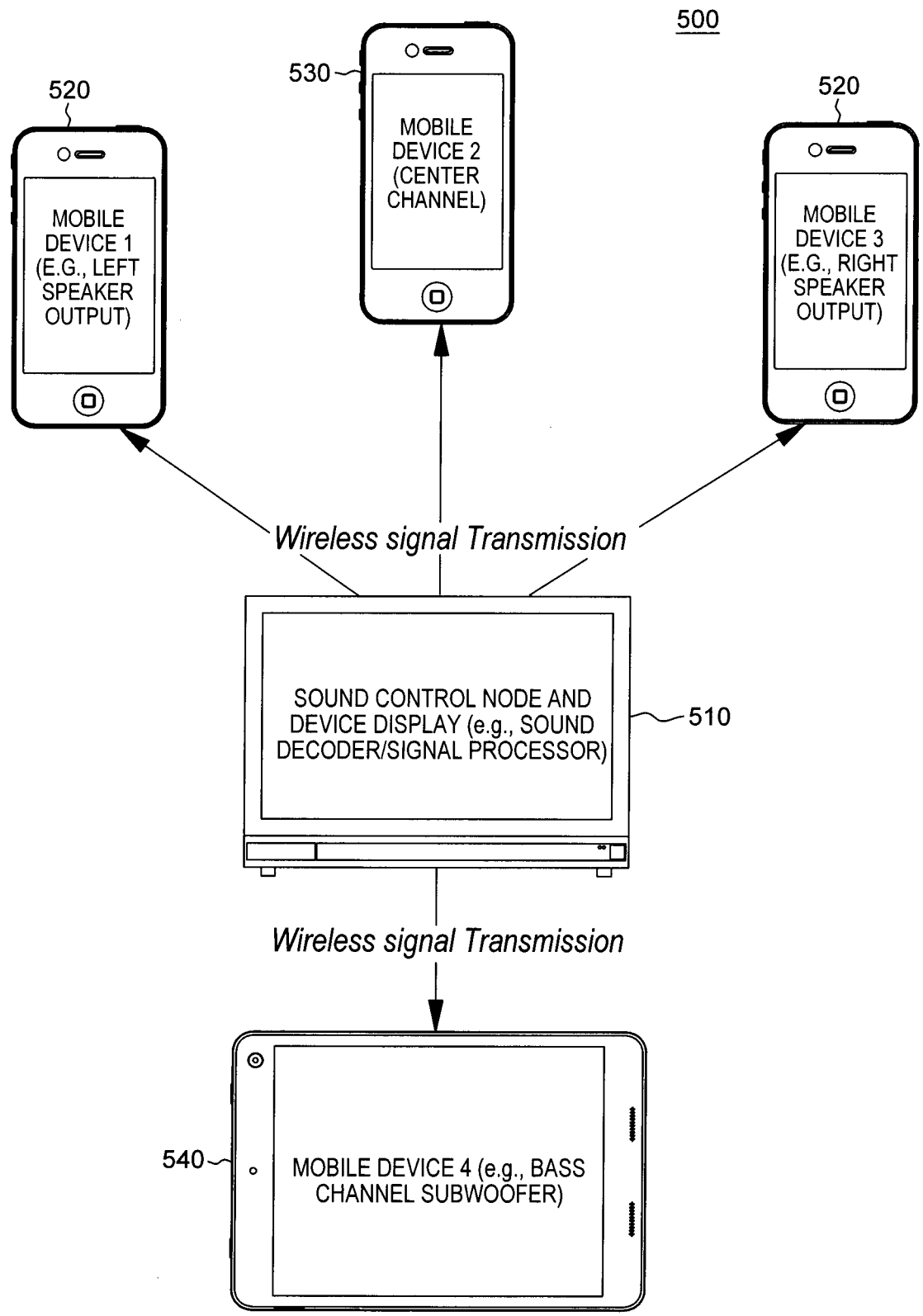
FIG. 5 is an illustration of another embodiment of a dynamically-configured, wireless sound system, in accordance with one or more aspects of the present invention.

By way of further example, FIG. 5 illustrates a wireless surround sound system 500, which may be implemented, in accordance with the processing described herein. For instance, a control node, with an associated device display 510 may be available, or designated. The control node includes a signal processor, as well as a sound decoder, for splitting the audio signals into separate wireless channels, again as will be understood by those skilled in the art. In one or more implementations, control node 510 may have a node proximity search enabled, for instance, by a user, which searches wirelessly for nearby wireless devices, as well as the location of the devices relative to the control node 510. In this example, the wireless devices are shown to include mobile devices 520 which operate as left and right speakers, mobile device 530 which operates as a center channel speaker, and mobile device 540, which operates a channel sub-woofer. The component roles may be assigned as described above. For instance, once the proximity search is completed, or as part of the proximity search, the mobile devices are scanned, and unique identifiers for the mobile devices, such as model number, serial number, etc., are obtained, for instance, by looking at the settings of the mobile devices through a basic API. This information is then employed by control node 510 to ascertain acoustic-related specifications for each of the mobile devices. Again, the acoustic-related specifications may be any relevant specifications including, for instance, sound chip and/or speaker specifications, such as speaker size, speaker volume, base range, processor size, etc. The information may be ascertained, in one or more embodiments, through a lookup in a specification or registration file, which may include mobile device identifying information, as well as the desired acoustic-related specification information. The file could be in a database accessible by the control node in an offline manner, or, accessible by the control node across the Internet, such as in a cloud computing environment. Alternatively, or in combination, the control node could search across the Internet one or more manufacturer files or databases to ascertained the desired acoustic-related specifications for one or more of the identified mobile devices within wireless proximity to the control node.

The acoustic-related specifications for the mobile devices are compared with the desired specifications for the component roles, such as the sub-woofer, center speaker, and left and right front speakers, to perform a comparative analysis as to which mobile device would be best for which role. In one or more implementations, each mobile device is given a component rating for at least one component role within the sound system, and in certain embodiments, for each component role within the sound system. The mobile device with the highest component rating for the desired component role is then assigned that role for the sound system. This can occur for the multiple mobile devices identified within wireless proximity to the control node, and in certain cases, two or more of the devices may act as a co-component, meaning that the two devices may have the same component role, depending on the number of devices available for inclusion in the sound system. Once the mobile devices are identified for participation in the sound system, and component roles are assigned, the control node signal processor may split the audio signal, using basic enabling techniques in the art for channel splitting, and sends the split audio signals to the respective mobile devices performing the designated component roles. The mobile devices emit sound per their designated role, until they are no longer required for the sound system, or are moved out of wireless proximity to the control node.

Those skilled in the art will note from the description provided herein, that establishing a wireless sound system as described includes analyzing the mobile device's capabilities to determine the best fit component role for each mobile device within the sound system. Once assigned, the mobile devices receive the respective designated signal channels and reproduce the desired sound. In one or more implementations, the processing described herein is automatic, and may be performed dynamically whenever a mobile device enters or leaves wireless proximity to the control node. Advantageously, using the processing described herein, the best sound system experience is ensured. In addition to using the acoustic-configurable capabilities of the mobile devices to determine where best to place each mobile device within the sound system, the device's capabilities may be further utilized to fine-tune the sound system so that each mobile device in the sound system is used as best suited within its selected role within the sound system. That is, the selected role of each mobile device may be fine-tuned based on the acoustic-configurable capabilities of that device so as to provide a best-sounding system. For instance, in one or more embodiments, if a mobile device is assigned to a left or right front channel in a sound system, then the acoustic signals provided for that channel may be customized based on the mobile device's sound capabilities by, for instance, enhancing and/or suppressing certain aspects of the acoustic signal being delivered to that channel, in view of the device's capabilities.

Exemplary embodiments of a computing environment to implement one or more aspects of the present invention are described below with reference to FIGS. 6-8.

Figure 6:
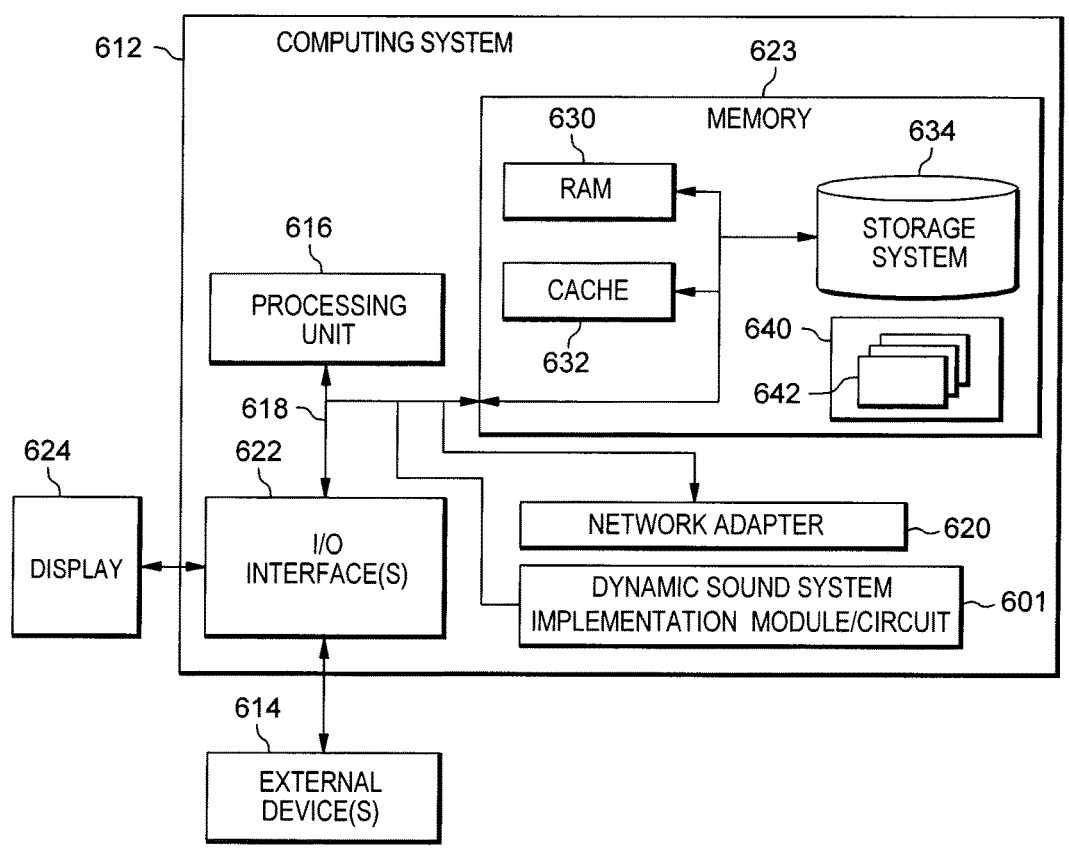
FIG. 6 depicts one embodiment of a computing system (e.g., control node) which may incorporate processing for dynamically configuring a wireless sound system, in accordance with one or more aspects of the present invention.

By way of further example, FIG. 6 depicts one embodiment of a computing environment 600, which includes a computing system 612. Examples of well-known computing systems, environments, and/or configurations that may be suitable for use with computer system 612 include, but are not limited to, a wireless computer, a handheld or laptop computer or device, a mobile phone, a programmable consumer electronic device, a tablet, a personal digital assistant (PDA), and the like.

Computing system 612 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 6, computing system 612, is shown in the form of a general-purpose computing device. The components of computing system 612 may include, but are not limited to, one or more processors or processing units 616, a system memory 623, and a bus 618 that couples various system components including system memory 623 to processor 616.

In one embodiment, processor 616 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 612 may include a variety of computer system readable media. Such media may be any available media that is accessible by computing system 612, and it includes both volatile and non-volatile media, removable and non-removable media.

System memory 623 can include computer system readable media in the form of volatile memory, such as random access memory (RAM) 630 and/or cache memory 632. Computing system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 618 by one or more data media interfaces. As described below, memory 623 may include at least one program product having a set (e.g., at least one) of program modules that are configured to carry out the functions of embodiments of the invention.

Program/utility 640, having a set (at least one) of program modules 642, may be stored in memory 632 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Alternatively, a separate, dependent context processing system, module, logic, etc., 601 may be provided within computing environment 612.

Computing system 612 may also communicate with one or more external devices 614 such as a keyboard, a pointing device, a display 624, etc.; one or more devices that enable a user to interact with computing system 612; and/or any devices (e.g., network card, modem, etc.) that enable computing system 612 to communicate with one or more other computing devices. Such communication can occur via Input/Output (I/O) interfaces 622. Still yet, computing system 612 can communicate with one or more networks such as a local area network (LAN), a general wide area network (WAN), and/or a public network (e.g., the Internet) via network adapter 620. As depicted, network adapter 620 communicates with the other components of computing system, 612, via bus 618. It should be understood that although not shown, other hardware and/or software components could be used in conjunction with computing system 612. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 6. Computer system/server 612 of FIG. 6 may be practiced in distributed cloud computing environments where tasks are performed by remote processing devices that are linked through a communications network. In a distributed cloud computing environment, program modules may be located in both local and remote computer system storage media including memory storage devices. Computer system/server 612 is capable of being implemented and/or performing any of the functionality set forth hereinabove.

Figure 7:
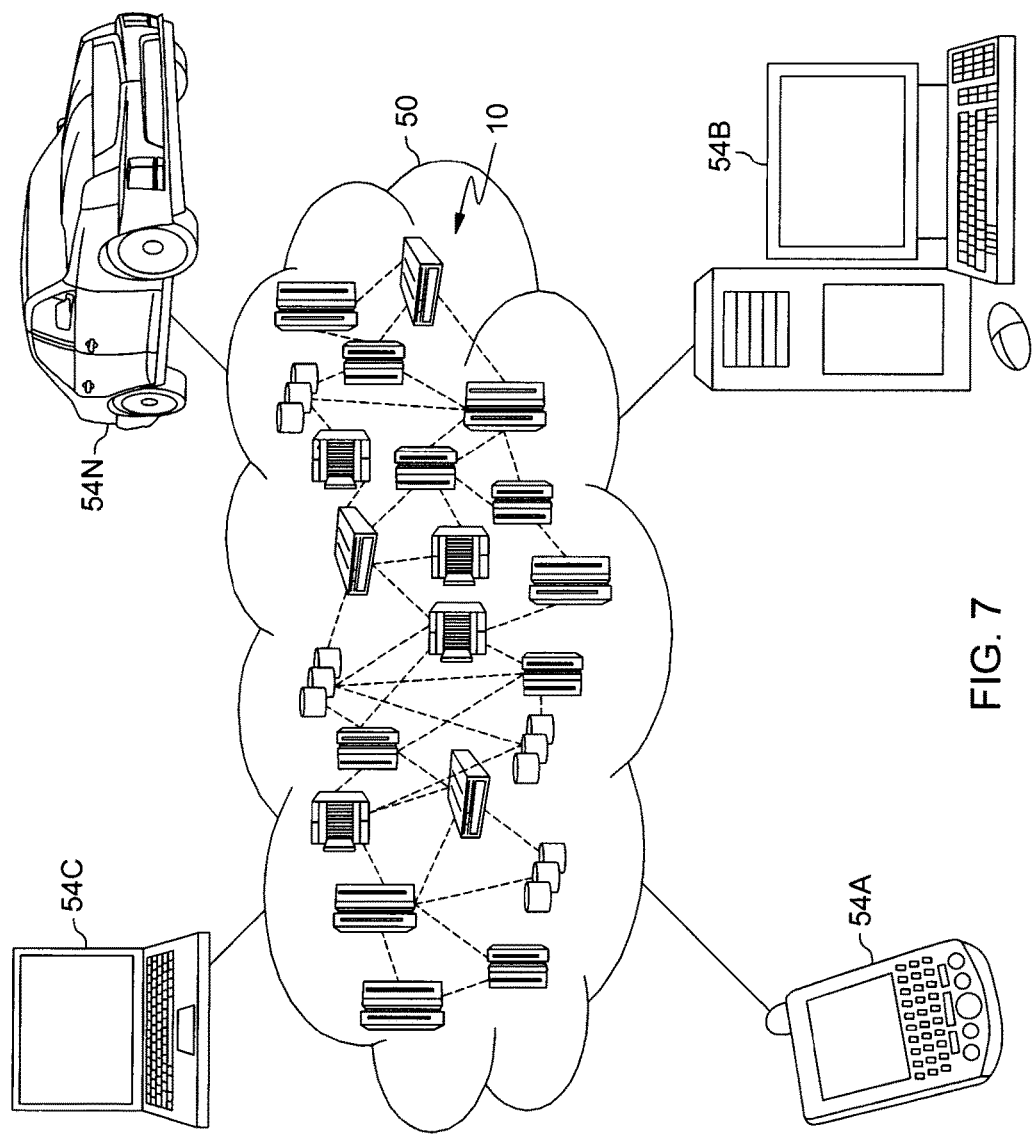
FIG. 7 depicts one embodiment of a cloud computing environment, which may facilitate implementing, or be used in association with one or more aspects of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
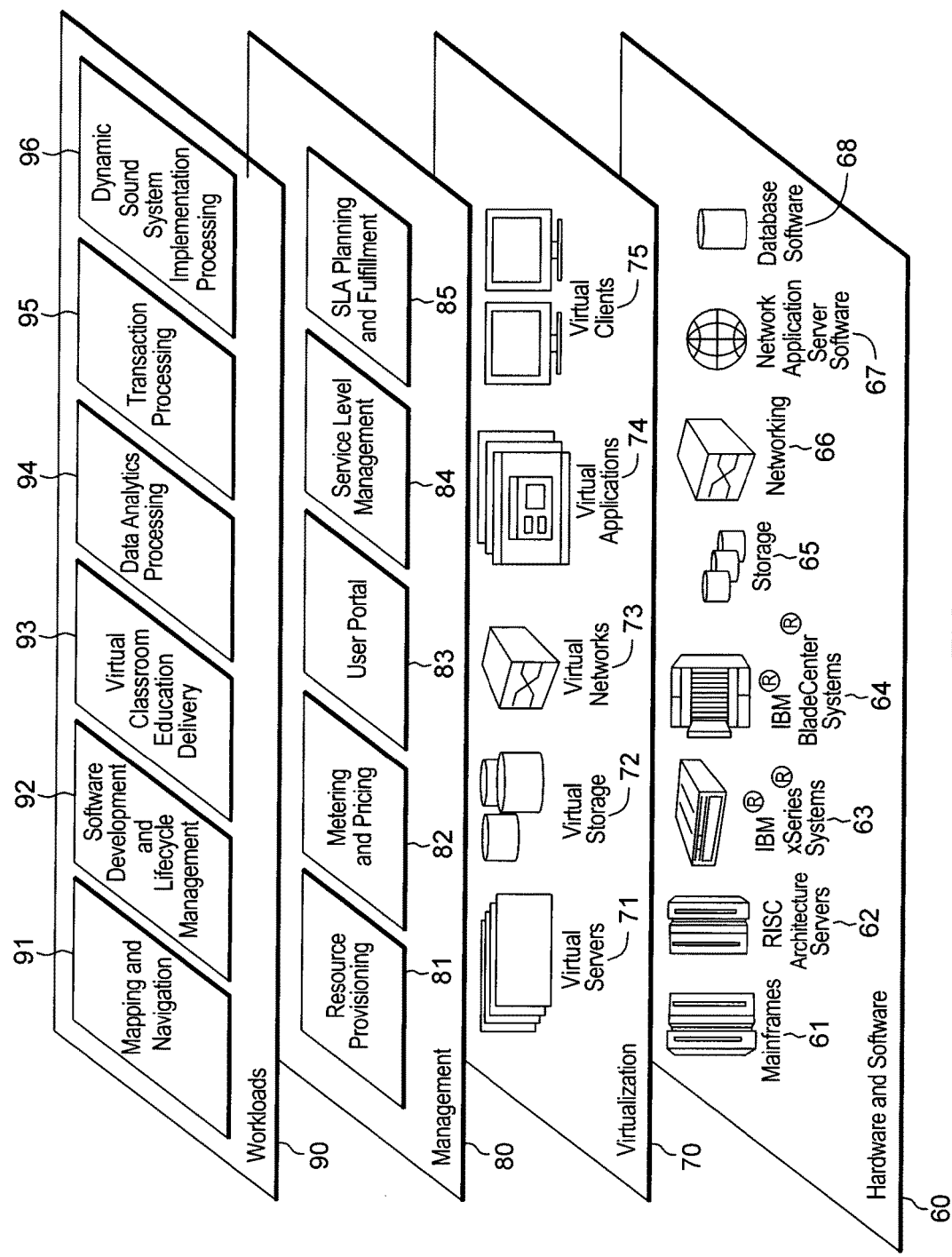
FIG. 8 depicts an example of extraction model layers, which may facilitate implementing dynamic configuration of a wireless sound system using mobile devices, in accordance with one or more aspects of the present invention.

Referring to FIG. 8, a set of functional abstraction layers provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic sound system implementation processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of establishing a wireless sound system comprising:
   obtaining identifying information on multiple mobile devices within wireless proximity to a control node of the sound system;
   automatically ascertaining acoustic-related specifications for the multiple mobile devices using the identifying information;
   dynamically assigning, based on the acoustic-related specifications, the multiple mobile devices to different component roles within the sound system;
   sending wireless signal channels to the multiple mobile devices based on their different component roles to provide acoustic output of the sound system; and
   wherein the dynamically assigning comprises comparing the acoustic-related specifications of the multiple mobile devices to desired specifications for one or more different components roles for the sound system, and assigning each mobile device of the multiple mobile devices at least one component rating based on comparing that mobile device to the desired specifications for at least one component role in the sound system, and using the assigned component ratings to automatically assign at least one mobile device of the multiple mobile devices to the at least one component role in the sound system.

2. The method of claim 1, wherein the obtaining comprises automatically identifying by the control node the multiple mobile devices within wireless proximity to the control node using a device proximity search.

3. The method of claim 2, wherein the automatically obtaining comprises automatically obtaining, for each mobile device of the multiple mobile devices within wireless proximity to the control node, an identifier selected from a group consisting of a device serial number, a device model number, and a unique device identifier number.

4. The method of claim 1, wherein the automatically ascertaining comprises retrieving the acoustic-related specifications for the multiple mobile devices from a device specification file accessible by the control node of the sound system.

5. The method of claim 1, wherein the automatically ascertaining comprises automatically ascertaining by the control node the acoustic-related specifications for the multiple mobile devices from a search across the Internet of one or more mobile-device-related files.

6. The method of claim 1, wherein at least two mobile devices of the multiple mobile devices have different acoustic-related specifications.

7. The method of claim 1, wherein at least two component nodes of the component nodes within the sound system have different desired specifications, and the dynamically assigning matches mobile devices to component roles based on a comparison of the acoustic-related specifications of the multiple mobile devices to the desired specifications of the component roles within the sound system.

8. The method of claim 1, wherein the using comprises selecting, for a particular component role of the at least one component role in the sound system, the mobile device of the multiple mobile devices with the highest assigned component rating relative to the desired specifications for that component role.

9. The method of claim 1, wherein the sending is from the control node of the sound system, and the control node of the sound system has a display unit associated therewith.

10. The method of claim 9, wherein the control node is another mobile device.

11. A system for establishing a wireless sound system, the system comprising:
    a memory; and
    a processing device communicatively coupled with the memory, wherein the system performs a method comprising:
       obtaining identifying information on multiple mobile devices within wireless proximity to a control node of the sound system;
       automatically ascertaining acoustic-related specifications for the multiple mobile devices using the identifying information;
       dynamically assigning, based on the acoustic-related specifications, the multiple mobile devices to different component roles within the sound system;
       sending wireless signal channels to the multiple mobile devices based on their different component roles to provide acoustic output of the sound system; and
       wherein the dynamically assigning comprises comparing the acoustic-related specifications of the multiple mobile devices to desired specifications for one or more different components roles for the sound system, and assigning each mobile device of the multiple mobile devices at least one component rating based on comparing that mobile device to the desired specifications for at least one component role in the sound system, and using the assigned component ratings to automatically assign at least one mobile device of the multiple mobile devices to the at least one component role in the sound system.

12. The system of claim 11, wherein the automatically obtaining comprises automatically obtaining, for each mobile device of the multiple mobile devices within wireless proximity to the control node, an identifier selected from a group consisting of a device serial number, a device model number, and a unique device identifier number.

13. The system of claim 11, wherein at least two component nodes of the component nodes within the sound system have different desired specifications, and the dynamically assigning matches mobile devices to component roles based on a comparison of the acoustic-related specifications of the multiple mobile devices to the desired specifications of the component roles within the sound system.

14. The system of claim 11, wherein the using comprises selecting, for a particular component role of the at least one component role in the sound system, the mobile device of the multiple mobile devices with the highest assigned component rating relative to the desired specifications for that component role.

15. The system of claim 11, wherein the control node is another mobile device, and at least two mobile devices of the multiple mobile devices have different acoustic-related specifications.

16. A computer program product for facilitating establishing a wireless sound system, the computer program product comprising:

a computer readable storage medium readable by a processing circuit and storing instructions for execution by the processing circuit for performing a method comprising:

obtaining identifying information on multiple mobile devices within wireless proximity to a control node of the sound system;

automatically ascertaining acoustic-related specifications for the multiple mobile devices using the identifying information;

dynamically assigning, based on the acoustic-related specifications, the multiple mobile devices to different component roles within the sound system;

sending wireless signal channels to the multiple mobile devices based on their different component roles to provide acoustic output of the sound system; and wherein the dynamically assigning comprises comparing the acoustic-related specifications of the multiple mobile devices to desired specifications for one or more different components roles for the sound system, and assigning each mobile device of the multiple mobile devices at least one component rating based on comparing that mobile device to the desired specifications for at least one component role in the sound system, and using the assigned component ratings to automatically assign at least one mobile device of the multiple mobile devices to the at least one component role in the sound system.

17. The computer program product of claim 16, wherein at least two component nodes of the component nodes within the sound system have different desired specifications, and the dynamically assigning matches mobile devices to component roles based on a comparison of the acoustic-related specifications of the multiple mobile devices to the desired specifications of the component roles within the sound system.

\* \* \* \* \*